United States Patent
Lederer et al.

(10) Patent No.: US 6,949,211 B2
(45) Date of Patent: Sep. 27, 2005

(54) MEANS OF MANUFACTURING PLURAL OPTIMIZED COGGED DRIVE BELTS

(75) Inventors: Steven Andrew Lederer, Fairlawn, OH (US); Tao Song, Hudson, OH (US); Brian Dean Wegele, Kemble (CA)

(73) Assignee: The Goodyear & Rubber Company, Akron, OH (US)

( * ) Notice: Subject to any disclaimer, the term of this patent is extended or adjusted under 35 U.S.C. 154(b) by 359 days.

(21) Appl. No.: 10/417,359

(22) Filed: Apr. 16, 2003

(65) Prior Publication Data

US 2004/0207111 A1 Oct. 21, 2004

(51) Int. Cl.$^7$ .............................................. B29C 35/00
(52) U.S. Cl. ................... 264/219; 264/238; 264/326; 156/137; 156/139; 156/140; 156/141; 156/142
(58) Field of Search ................. 264/219, 237–238, 264/279.1, 319–320, 326; 156/137, 139, 140–142

(56) References Cited

U.S. PATENT DOCUMENTS

| | | | |
|---|---|---|---|
| 3,482,004 A | 12/1969 | Anderson | 264/25 |
| 3,964,328 A | * 6/1976 | Redmond, Jr. | 474/205 |
| 4,002,082 A | 1/1977 | Waugh | 74/231 C |
| 4,011,766 A | 3/1977 | Waugh | 74/234 |
| 4,034,615 A | 7/1977 | Brooks | 74/229 |
| 4,053,547 A | * 10/1977 | Redmond, Jr. | 264/102 |
| 4,264,314 A | 4/1981 | Imamura | 474/205 |
| 4,266,937 A | * 5/1981 | Takano et al. | 474/205 |
| 4,305,714 A | * 12/1981 | Renshaw | 474/250 |
| 4,449,959 A | 5/1984 | Matsumura | 474/238 |
| 4,512,834 A | 4/1985 | Kohrn | 156/138 |
| 4,575,445 A | 3/1986 | Fujita et al. | 264/291 |
| 4,832,670 A | 5/1989 | Miranti, Jr. | 474/205 |
| 4,898,567 A | 2/1990 | Tatara et al. | 474/174 |
| 5,055,090 A | 10/1991 | Miranti, Jr. | 474/249 |
| 5,215,504 A | 6/1993 | Wong et al. | 474/237 |
| 5,308,291 A | 5/1994 | Robertson et al. | 474/205 |
| 5,358,453 A | 10/1994 | Kimura et al. | 474/238 |
| 5,382,198 A | 1/1995 | Janne | 474/205 |
| 5,749,800 A | 5/1998 | Nagel et al. | 474/84 |
| 5,979,639 A | 11/1999 | Sytema | 198/731 |
| 5,984,816 A | 11/1999 | Nishio et al. | 474/87 |
| 6,045,735 A | 4/2000 | Berthelier | 264/139 |
| 2002/0098935 A1 | 7/2002 | Danhauer et al. | 474/261 |

FOREIGN PATENT DOCUMENTS

| | | | |
|---|---|---|---|
| DE | 2906619 | 7/1980 | F16G/1/28 |
| DE | 4016469 | 11/1991 | B18G/5/20 |
| DE | 4331482 | 3/1994 | F16H/7/06 |
| EP | 0541004 | 11/1991 | B60C/11/00 |
| EP | 1270994 | 1/2003 | F16G/5/20 |
| GB | 2094439 | 3/1982 | F16G/1/28 |
| JP | 55166549 | 12/1980 | F16G/5/04 |
| JP | 61270535 | 11/1986 | F16G/5/16 |
| JP | 5296294 | 11/1993 | F16G/5/20 |
| JP | 20002302 | 1/2000 | F16G/5/20 |

* cited by examiner

*Primary Examiner*—Stefan Staicovici
(74) *Attorney, Agent, or Firm*—Richard B. O'Planick

(57) ABSTRACT

A multi-ribbed power transmission belt having longitudinal grooves and transverse grooves that form a plurality of cogs on the belt surface defined between adjacent transverse grooves is provided. The pitch lengths of the rows of cogs are randomized or sequenced over the entire length of the belt to reduce the noise of the belt as it travels about its associated pulleys. The ideal pitch pattern on a belt is variable, dependent upon the circumferential length of the belt. To create an optimized pitch sequence for belts of various circumferential lengths, a method of manufacture is employed wherein a portion of the pitch sequence of a shorter belt is incorporated within an optimized pitch sequence of a longer belt and both belts are manufactured from a single mold. The longer belt may contain cogs of various shapes intended to offset a range of frequencies and minimize noise generation. By selecting a certain span of the longer belt for the creation of smaller belt(s), a single mold may be utilized for producing belts of varying length and the noise characteristics of the belt may be controlled and optimized.

11 Claims, 2 Drawing Sheets

MEANS OF MANUFACTURING PLURAL OPTIMIZED COGGED DRIVE BELTS

FIELD OF THE INVENTION

The invention relates generally to multi-ribbed power transmission belts having a cog design and sequence intended to minimize noise while in operation and, more particularly, to the manufacture of such belts in varying sizes.

BACKGROUND OF THE INVENTION

Power transmission belts having a variety of groove and rib configurations are known. One such belt is a multi-ribbed belt. The multi-ribbed belts have a tension section, a load carrying section, and a compression section. Multi-ribbed belts may also be provided with transverse grooves; such transverse grooves extending either traverse to the belt or at an angle relative to the traverse direction of the belt. The longitudinal and transverse grooves are located in the compression section. Such belts are known as cogged multi-ribbed belts, examples of which are disclosed in U.S. Pat. Nos. 4,002,082 and 5,382,198. Cogged multi-ribbed belts exhibit improved flexibility and longer life.

However, cogged multi-ribbed belts create more noise due to a non-continuous rib entering and exiting the grooved pulley. Noise is generated when the tooth travels and presses into the pulley groove, compressing and displacing the air in the groove and noise is generated when the tooth exits the pulley groove as air rushes to fill the now empty pulley groove. Furthermore, there are harmonic noise spikes generated by the cogs at the cog engagement frequency.

Two methods are known to reduce the noise of a cogged multi-ribbed belt. The first is to incline the transverse grooves at an angle relative to the transverse direction. This reduces the overall noise level but the harmonic noise spikes are often still objectionable.

The second is to vary the pitch of the cogs with a repeating pitch pattern, as disclosed by U.S. Pat. Nos. 4,262,314 and 4,832,670. U.S. Pat. No. 4,262,314 discloses a cog belt with reduced noise. The transverse groove depths, the groove angles, and the distance between the grooves are varied. Similar to U.S. Pat. No. 4,262,314, U.S. Pat. No. 4,832,670 also discloses multiple elements of the belt construction are varied simultaneously to produce a reduced noise belt. The belt is defined by a repeating sequence pattern along the length of the belt. An ideal pitch pattern that results in a minimization of noise, however, needs to vary based on the circumferential length of the belt. Thus, to optimize reduction of noise in belts of varying length, each belt would require a unique respective pitch sequence or pattern.

The manufacture of a cogged, multi-ribbed belt may be effected in a plurality of processes common to the industry. U.S. Pat. Nos. 4,575,445 and 4,512,834 illustrate and describe two such manufacturing processes and are representative of the manufacture of a cogged belt from one or more molds. A third alternative process begins with a metal preform board. The cog profile is machined into the board and a rubber matrix is made from the preform board. This matrix is then spliced on the outside of green diaphragm rubber to form a diaphragm mold. The diaphragm molds hence have an external cog profile identical to the actual belt and the rubber diaphragm molds are then used to make diaphragms. Belt materials are plied on a build mandrel and dropped into a diaphragm in a cure pot. After a slab of the belts have been formed and cured, "v's" are milled and slit into individual belts. The three processes referenced above are not exclusive and other cogged belt manufacturing methods are known and utilized in the industry. Common to numerous known approaches is that one or more molds are used for the purpose of creating the cog sequence in a belt. For belts having a repeating or random cog sequence, the molds used in the manufacture thereof must mirror the desired cog profile and pattern.

From the foregoing, it will be appreciated that the creation of one or more molds for the purpose of manufacturing a cogged belt, by any of the processes known and practiced in the industry is an investment of capital and, hence, expensive. Since a mold is cog-profile specific, that is, identical to the cog profile desired in the actual belt, belts having cogs of differing profiles or pitch sequencing are typically formed from a mold unique to the belt.

As mentioned above, it is often desirable to utilize a repeating pitch pattern to reduce the noise generated from a cogged multi-ribbed belt. However, the ideal pitch pattern on a belt needs to vary based on the circumferential length of the belt. Heretofore, in order to manufacture a belt of a given circumferential length, a unique, dedicated mold providing the requisite optimized pitch sequence was required. Because the creation of a unique mold for each length of belt is cost prohibitive, the industry practice has been to been slow to adopt noise reduction techniques in cog design and sequence in belts of varying length. While this practice avoids the costly proliferation of unique, belt-length dependent, manufacturing molds, optimized noise reduction is sacrificed.

SUMMARY OF THE INVENTION

The present invention is directed to the economical and optimized manufacture of a power transmission belt of a type known in the industry. Such belts typically have an inner surface comprising longitudinally extending grooves and transverse grooves. The transverse grooves may be inclined at an angle (for example, less than 90°) relative to the longitudinal direction of the belt and all the transverse grooves may have the same or a mutually differentiated groove depth. The transverse and longitudinal grooves form transverse rows of cogs on the belt inner surface. The rows of cogs may have different longitudinal lengths, and the rows may be randomly arranged along the entire length of the belt. The pitch lengths of the rows of cogs are randomized or sequenced over the entire length of the belt to reduce the noise of the belt as it travels about its associated pulleys. The ideal pitch pattern on a belt is variable, dependent upon the circumferential length of the belt.

Pursuant to one aspect of the invention, to create an optimized pitch sequence for at least two belts of differing lengths, a method of manufacture is employed wherein a the optimized pitch sequence of the shorter belt is incorporated into the optimized pitch sequence of the longer belt. A single mold may thus be employed in the manufacture of either belt. The longer belt may contain cogs of various shapes intended to offset a range of frequencies and minimize noise generation. By selecting a certain pitch sequence span along the mold for the longer belt, the shorter belt may be manufactured from the same mold and the noise characteristics of the smaller belt may be controlled and optimized. Tooling costs are minimized and noise reduction is facilitated without the costly proliferation of molds for belts of differing lengths.

In another aspect of the invention, the optimized pitch sequence for two or more belts of differing lengths are incorporated into the optimized pitch sequence of a longer third belt. Different spans along a single mold for the longest belt may be selected and utilized, to the exclusion of unselected other spans along the mold, in the manufacture of the smaller belts. The noise characteristics of the smaller belts may thus be controlled and optimized using the same mold that is used in the formation of longer belts.

The subject invention is described in a preferred embodiment below and illustrated in the accompanying drawings.

BRIEF DESCRIPTION OF THE DRAWINGS

The invention will be described by way of example and with reference to the accompanying drawings in which.

DETAILED DESCRIPTION OF THE INVENTION

Figure 1:
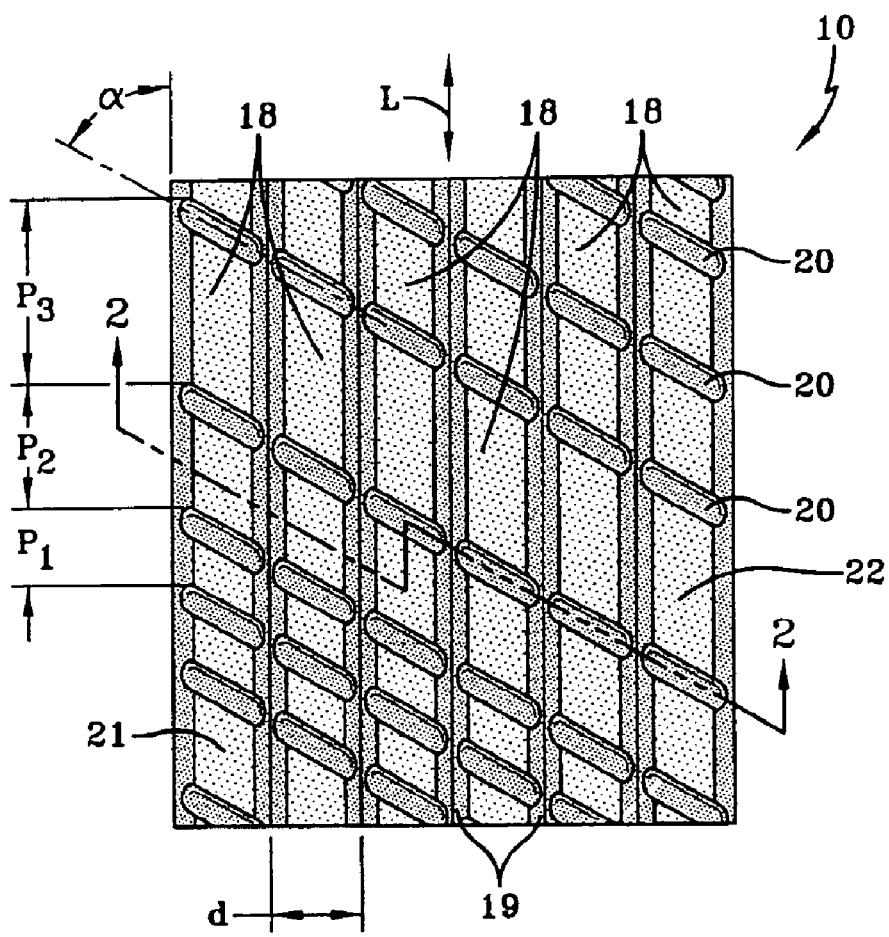
FIG. 1 is a bottom plan view of a section of the belt of this invention.
Figure 2:
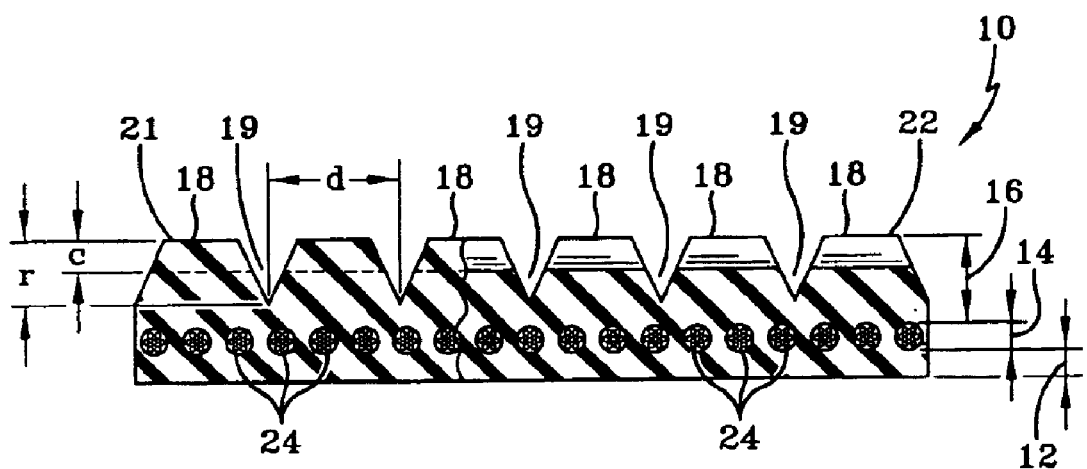
FIG. 2 is an enlarged view of the belt taken along the line 2—2 in FIG. 1.

A multi-ribbed power transmission belt 10 of a type commercially available in the industry is shown in FIGS. 1 and 2. Belts such as belt 10 may be formed in various lengths, each belt having an optimized pitch sequence pursuant to the invention. Other belt configurations may also utilized the teachings of the invention. Belt 10 is one of many belt configurations that may be produced has a tension section 12, a load carrying section 14, and a compression section 16. The compression section has a plurality of longitudinal ribs 18 formed by parallel longitudinal grooves 19 and a plurality of parallel transverse grooves 20. The transverse grooves 20 are oriented at an angle α other than perpendicular to the longitudinal direction L. The combination of longitudinal grooves 19 and transverse grooves 20 form a plurality of cogs 21 on the belt surface, with a transverse cog row 22 being defined between adjacent transverse grooves 20.

The angle α of the transverse grooves 20 is from 20° to 85°. While the number of ribs shown in the drawings is six, it should be appreciated that a multi-ribbed transmission belt may contain anywhere from three upwards to thirty or more. The grooves 20 may be U shaped, V shaped, or V shaped with a rounded bottom or any other convenient shape. The depth c of all the transverse grooves 20 are the same and the depth r of all the longitudinal grooves 19; however, the depth c of the transverse grooves 20 can be the same or different from the depth r of the longitudinal grooves 19. Alternatively, the depth can vary from transverse groove to transverse groove if desired. The depth r of the longitudinal grooves 19 is generally greater than the depth c of the transverse grooves 20 but not so deep as to cut into the longitudinal reinforcing cords 24.

Each transverse cog row 22 has a longitudinal length P extending from a location on the cog 21 to the identical location on the longitudinally adjacent cog 21; the determining location, as seen in FIG. 1, is best selected to be a corner edge adjacent to the transverse groove 20. In accordance with the invention, the longitudinal length P of adjacent cog rows 22 may not have the same length P. In the illustrated belt, the belt has three discrete different longitudinal lengths, $P_1$, $P_2$, and $P_3$.

Typical normalized length ratios of lengths of the small, medium and large lengths useful in the belt 10 include 9-10-11, 11-13-15, 5-6-7, 9-11-13, 7-9-11, 9-10-12, 6-7-9, and 4-7-10. While these ratios are only for three differing normalized longitudinal lengths, it is possible to utilize three to six different longitudinal lengths. The total number of longitudinal lengths, $P_n$, for a particular belt would be limited by the belt size and the complexity of the mold required to form the belt.

Because the multi-ribbed belt 10 is driven about its associated grooved pulleys due to the friction interaction between the pulley grooves and the sides of the longitudinal ribs 18, the sequencing of the different longitudinal lengths $P_1$, $P_2$, $P_3$ need not be limited to a repeating defined period. The longitudinal lengths along the entire length of the belt may be randomized.

One exemplary sequencing pattern for a belt, using three discrete pitch lengths is:

3 3 3 2 1 2 3 2 3 2 1 1 2 1 1 2 1 2 3 1 3 3 1 2 2 2 1 3 1 2 1 3 1 1 1 2 3 3 2 2 2 3 2 1 1 3 3 3

2 1 2 3 2 3 3 2 1 2 2 1 1 3 2 1 2 3 1 1 3 1 2 3 2 1 1 3 1 2 2 3 3 3 1 1 3 3 2 3 1 1 1 2 2 3 2 1

1 2 1 3 3 2 3 3 3 2 2 3 3 1 1 3 2 1 2 2 1 1 3 2 2 3 3 3 1 2 2 1 1 1 2 3 2 3 1 1 1 2 1 2 2 3 3 1

1 3 2 1 3 3 2 3 1 3 3 2 3 2 1 2 3 1 3 1 1 2 1 2 1 2 3 3 2 3 3 3 1 1 2 1 2 3 2 2 2 2 3 3 2 1 1 3

2 3 2 3 1 2 2 1 2 1 3 1 1 1 1 3 2 1 2 1 3 3 2 3 2 1 2 1 2 3 2 1 2 2 3 1 1 1 3 1 3 1 3 2 3 3 2 1

1 2 3 1 2 2 3 2 3 3 3.

The only limitation in sequencing of the pitch lengths is a limitation on the number of adjacent similar pitch lengths. If too many cogs rows 22 having an identical pitch length are adjacent, then the desired reduction in noise may not be achieved. Additionally, if too many cog rows 22 having a small pitch length are adjacent, durability issues may arise. No more than six, preferably four, identical longitudinal length cog rows 22 should be adjacent to one another.

To determine the actual longitudinal length of the cog rows 22, the following equation is used:

((length ratio number)*(belt length))/(total normalized length for sequence).

For example, using the sequence listed above and the ratio combination of 4-7-10, the total normalized length for the sequence is 1760. The total normalized length is achieved by substituting the ratio length number (i.e., 4, 7, or 10) for the sequence length (i.e. 1, 2, or 3) and than adding up the length numbers for the entire sequence. For a belt length of 222.60 cm (87.6 inches), and using the sequence above, the longitudinal lengths are:

small length $P_1$: (4*222.6)/1760=0.506 cm medium length $P_2$: (7*222.6)/1760=0.885 cm large length $P_3$: (10*222.6)/1760=1.265 cm.

A second pitch sequence using three pitch lengths is:

2 1 1 1 1 3 2 1 2 3 1 2 2 1 1 3 2 3 2 1 2 1 3 2 3 2 3 3 1 3 3 2 2 2 1 1 2 1 2 2 3 1 3 3 2 1 3 1

2 1 1 3 1 1 3 2 1 1 1 3 1 2 3 3 3 1 3 2 1 3 3 3 2 3 3 1 2 2 3 3 3 1 2 2 1 2 1 2 1 2 2 2 1 3 3 2

3 1 1 3 3 1 2 2 1 1 3 2 2 2 1 2 2 1 3 1 3 3 1 1 3 3 1 2 2 3 1 3 1 1 1 3 3 1 2 1 2 1 1 2 3 2 3 3

2 2 3 2 1 2 3 2 1 1 1 3 3 2 2 3 2 1 1 2 1 3 2 2 3 3 3 3 2 1 1 3 1 1 2 3 2 2 3 3 3 2 1 2 1 2 2 1

3 2 1 1 1 2 1 3 3 1 2 2 3 1 2 3 3 2 2 1 1 2 3 3 2 1 1 2 3 3 3 2 3 3 3 2 1 3 1 2 1 3 3 2 3 1 1 2

1 1 2 2 2 3 3 1 2 2 1 1 2 3 1 3 3 3 2 3 3 1 2 1 1 1 3 2 2 2 1 1 2 3 1 3 3 2 1 3 3 2 1 2 3 3 2

For this second pitch sequence, using a ratio combination of 4-7-10, the normalized length is 2016. For a belt length of 2560 mm, the longitudinal lengths are:

small length $P_1$: (4*256.0)/2016=0.508 cm
medium length $P_2$: (7*256.0)/2016=0.888 cm
large length $P_3$: (10*256.0)/2016=1.270 cm The belt of this invention is illustrated in the drawings as being elastomeric. The elastomers may be any one of those known to be suitable for use In such belts, e.g., polychloroprene, polyurethane, NBR, IIR, IR, SBR, CSM, EPDM, other thermosets, thermoplastic elastomers and other polymer alloys.

The load carrying section 14 of this belt can be made of any suitable material and used in any suitable technique known in the art. Preferably, the load carrying section 14 is made of a helically wound load carrying cord 24 having individual turns thereof arranged in substantially equally spaced relation across the belt body. These cords may be made from glass fibers, aramid fibers, carbon fibers, steel, polyester, high tenacity rayon, or polyaramide.

The preferred method of manufacturing the belt of this invention is to build the belt inverted on a rigid mandrel of the proper diameter. A layer of tension stock is first applied to the mandrel followed by the helical windings of the reinforcing cord 24. Then a layer of cushion stock is applied over the reinforcing cord 24. The angular grooves 20 are molded into the product at the time of cure by means of a flexible diaphragm having the helical pattern opposite that of the grooves placed around the cushion stock and compressed against the product by steam pressure, air pressure, or other means. Following the curing process, the longitudinal grooves are then formed in the conventional manner by machining, grinding, etc.

By pitching the cogged belt 10 in the manner disclosed in the present invention, the noise spikes at the harmonic frequency are reduced as well as the overall noise of the belt 10. As described previously, the optimum pitch sequence for a belt is dependent upon the length of the belt. Belts of various lengths, accordingly, will have a mutually exclusive optimal pitch sequence. The use of a dedicated mold for the production of each size belt in order to optimize its pitch sequence, however, is cost prohibitive. Pursuant to the present invention, therefore, a pitch sequence that will minimize noise in a smaller belt or smaller belts is selected from the pitch sequence of the longest belt. For example, with reference to FIG. 3 there are shown line diagrams for belts of various size (length). The belt lengths indicated are solely for the purpose of illustration, it being understood that the subject invention will apply to belts of other sizes.

Figure 3:
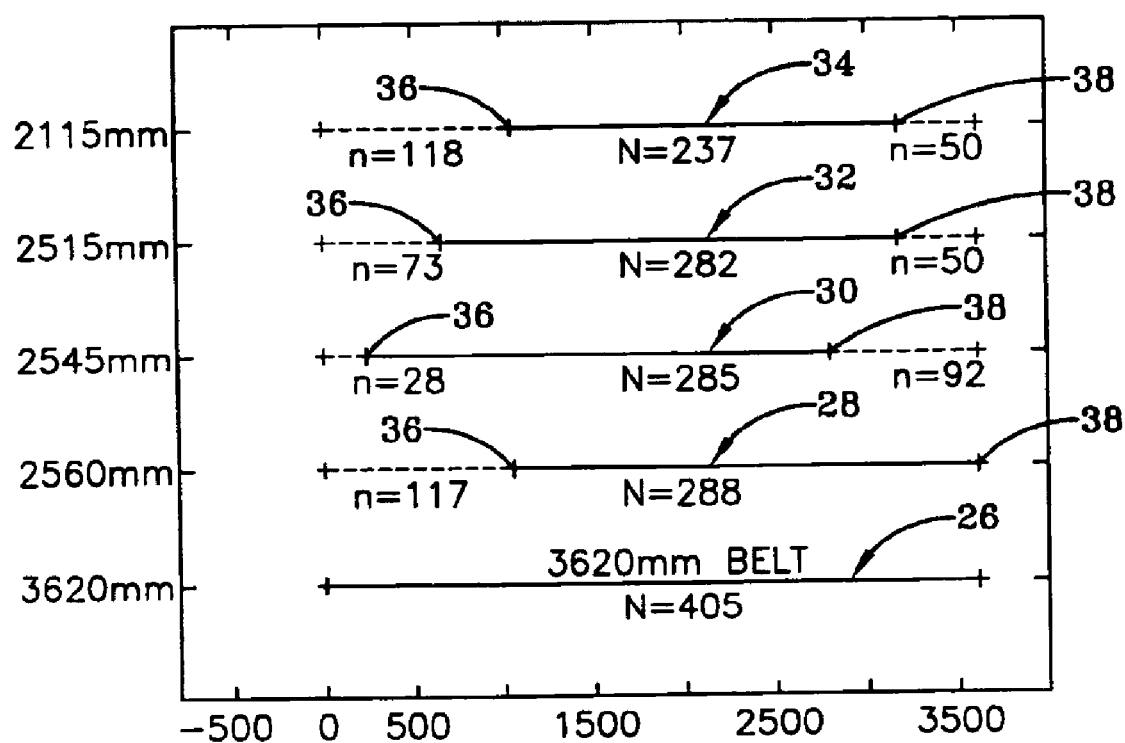
FIG. 3 is a diagrammatic representation of belts of various lengths and their manufacture pursuant to the invention from a single mold.

In FIG. 3, identification of belts of differing lengths is made along the y-axis. Represented belt lengths are, in order of diminishing length, 3620 mm; 2560 mm; 2525 mm; 2515 mm; and 2115 mm. The x-axis is scaled to reflect the length of each belt, with the longest belt 26 (3620 mm) referenced as a horizontal line beginning at the zero point on the x-axis and extending for 3620 mm. The remaining belts are represented as horizontal lines 28, 30, 32, and 34, respectively, each beginning at a respective reference point 36 on the graph and extending to a terminal point 38.

It will be appreciated that, pursuant to the invention, the longest belt 26 is formed from a mold. The process for forming a belt may be any one of several common in the industry. In the process described previously, the manufacture of a belt begins with a metal preform board. The cog profile is machined into the board and a rubber matrix is made from the preform board. This matrix is then spliced on the outside of diaphragm rubber to form a diaphragm mold. The diaphragm molds hence have an external cog profile identical to the actual belt and the rubber diaphragm molds are then used to make diaphragms. Belt materials are plied on a build mandrel and dropped into a diaphragm in a cure pot. After a slab of the belts have been formed and cured, "v's" are milled and slit into individual belts.

As used herein, "N(total)" represents the total number of cogs on the matrix board. In the example represented in FIG. 3, N(total) is 405. Thus, for the longest belt 26, all of the cogs on the matrix board are used to form the longest green belt, that is 405 cogs. While it is preferred that N(total) for the matrix board equate with the number of cogs necessary to create the longest belt, such is not mandatory. The longest belt 26 may, if desired, be formed from a mold having a greater number of cogs than necessary for the creation of belt 26. For economic reasons, however, it is preferred that the number of cogs in the mold not exceed the number of cogs necessary to produce the longest belt size. "N", as referred to in FIG. 3, represents the total number of cogs from the matrix board necessary to create a green belt for each specific belt length. "n" represents the number of cogs not used on the matrix board to form a give green belt length. The "n" value to the left side of the line representing each size of green belt represents the number of unused cogs to the left of the belt; the "n" value to the right representing the number of unused cogs to the right.

FIG. 3 illustrates that the invention uses one long mold with a given pitch sequence for forming the longest belt 26. Smaller belts are formed from spans of this long pitch sequence, each span beginning at a unique initiation point 36 and terminating at a unique terminal end point 38. The pitch sequence within each span 38, 30, 32, and 34 will therefore be unique and function to optimize the noise reduction for the particular belt size. The initiation points 36 will vary from belt size to belt size as well. For example, the 2560 belt span begins at a point 36 in which 117 cogs are unused to the left. Belt span 2545, however, has an initiation point 36 in which only 28 unused cogs remain to the left. The pitch sequence within each span 38, 30, 32, and 34 will accordingly be unique for each size belts but all sizes of belts may be formed from the pitch sequence comprising the longest belt 26.

The number of cogs in each belt span ("N") will likewise vary from belt to belt. The "N" value for belt 2560 is 288 cogs while the "N" value for belt 2545 is 285. Likewise the terminal points 38 may vary from belt size to belt size as well, depending on where the pitch sequence on the matrix board should end so as to optimize noise reduction for that size belt. For example, the terminal points 38 for belts 2115 and 2515 leaves n=50 cogs unused to the right, while the terminal point for belt 2545 leaves n=92 unused cogs to the right. For the 3620 mm belt, the n value is zero for both the left and right sides since it uses the entire matrix board.

It will be appreciated that N=N(total)−(n left+n right). The method of manufacture comprises the steps: making a mold for a long belt size that incorporates within the mold at least one pitch sequence optimal for reducing noise for a smaller belt size. An impression is made in the rubber and an optimal pitch sequence span is selected for the particular belt size desired. The selected optimal span is severed from the rest of the rubber and the unselected portions are discarded or reused.

While ideally it is preferable to incorporate, or integrate, a pitch sequence that minimizes the noise in the shorter belt(s) into the pitch sequence of the longer belt, such is not required to practice the subject invention. The long pitch sequence necessary to minimize the noise generated by the longer belt may not necessarily include a pitch sequence span necessary to reduce noise generation in the shorter belt to an absolute low. A compromise, however, may be attainable wherein a pitch sequence span in the longer pitch sequence may achieve an adequate noise reduction in the shorter belt even though an ideal pitch sequence in a separate mold may provide a further marginal reduction. The marginal improvement in noise reduction achievable by the ideal pitch sequence may not, however, be significant enough to warrant the creation of a separate mold for the shorter belt. A tradeoff in the noise reduction of the shorter pitch sequence span may be necessary and acceptable in exchange for eliminating the need for and expense of a separate mold. Use of the term "optimization", therefore, does not necessarily mean an absolute reduction of noise level generated by a belt. Rather, "optimization" as used herein means a relative reduction in noise to an acceptably low level while preserving the flexibility of using a single mold in the manufacture of belts of two or more sizes.

Conversely, pursuant to the invention an ideal pitch sequence for the reduction of noise in the longer belt may be compromised by the inclusion of pitch sequences within the long sequence for the purpose of manufacturing shorter belts from the same mold. The result may be a less than absolute noise reduction in the longer belt so as to optimize noise reduction in the shorter belt(s). However, again, an optimized trade off between the level of noise reduction in the longer belt and the smaller belt(s) may be achieved to accomplish a reduction in noise level in all belt sizes to an acceptably low level while preserving the flexibility of using a single mold in the manufacture of all belt sizes.

While the above describes a preferred embodiment for the practice of the invention, the invention is not intended to be so limited. Other embodiments that utilize the teachings herein set forth, are intended to be within the scope and spirit of the invention.

What is claimed is:

1. A method of manufacturing an optimized pitch sequence in a longer power transmission belt and at least one shorter power transmission belt, each belt being of the type having an inner surface comprising longitudinally extending grooves and transverse grooves that form rows of cogs on the belt inner surface, wherein the rows of cogs provide a sequenced or random pitch pattern along the entire length of the belt, the method comprising the steps:

creating a mold for the manufacture of the longer belt, the mold having a plurality of cogs formed therein to define a longer pitch sequence for optimizing noise reduction in the longer belt, the longer pitch sequence having incorporated therein at least one shorter pitch sequence span for optimizing noise reduction in the shorter belt; and selectively using the mold for manufacturing of the longer belt using the longer pitch sequence and the shorter belt using the shorter pitch sequence span.

2. A method in accordance with claim 1 wherein the method includes creating within the mold rows of cog having different longitudinal lengths.

3. A method in accordance with claim 1, wherein the longer pitch sequence having incorporated therein at least two shorter pitch sequence spans for optimizing noise reduction in at least two shorter respective belts, the method includes locating within the longer pitch sequence a respective initiation point and a respective terminal point for each said shorter pitch sequence span.

4. A method in accordance with claim 3 wherein the two shorter belts differ in length, each shorter belt having a unique set of initiation and terminal points within the longer pitch sequence.

5. A method in accordance with claim 1, wherein all of the cogs in the mold are utilized in the creation of the longer belt.

6. A method in accordance with claim 1, wherein less than all of the cogs in the mold are utilized in the creation of the longer belt.

7. A method of optimizing the cog pitch sequences in a plurality of power transmission belts of the belt type having an inner surface comprising longitudinally extending grooves and transverse grooves that form rows of cogs on the belt inner surface, the method comprising:

a. creating a common mold for the manufacture of the plurality of power transmission belts, the common mold having a plurality of cogs formed therein defining a longer cog pitch sequence for producing a longer belt of the plurality of belts and the longer pitch sequence having incorporated therein at least one shorter cog pitch sequence span for producing at least one shorter belt in the plurality of belts; and b. selectively using the common mold for manufacture of the longer belt using the longer pitch sequence and the shorter belt using the shorter pitch sequence.

8. A method in accordance with claim 7 wherein the method includes creating within the mold rows of cogs having different longitudinal lengths.

9. A method in accordance with claim 7 wherein the method includes locating within the longer pitch sequence a set of initiation and terminal points for the shorter pitch sequence span.

10. A method in accordance with claim 7, wherein all of the cogs in the mold are utilized in the creation of the longer belt.

11. A method in accordance with claim 7, wherein less than all of the cogs in the mold are utilized in the creation of the longer belt.

* * * * *